United States Patent
Freymiller et al.

(10) Patent No.: US 9,861,230 B2
(45) Date of Patent: Jan. 9, 2018

(54) COOKING APPARATUS WITH MODULAR COOKING SURFACES

(71) Applicant: Carrier Commercial Refrigeration, Inc., Farmington, CT (US)

(72) Inventors: Otley D. Freymiller, Deerfield, WI (US); Jeffrey L. Sands, Freeport, IL (US); Ronald J. Glavan, Rockton, IL (US); Dennis J. Nelson, Rockford, IL (US)

(73) Assignee: CARRIER COMMERCIAL REFRIGERATION, INC., Farmington, CT (US)

( * ) Notice: Subject to any disclaimer, the term of this patent is extended or adjusted under 35 U.S.C. 154(b) by 123 days.

(21) Appl. No.: 14/776,853

(22) PCT Filed: Mar. 10, 2014

(86) PCT No.: PCT/US2014/022618
§ 371 (c)(1),
(2) Date: Sep. 15, 2015

(87) PCT Pub. No.: WO2014/150219
PCT Pub. Date: Sep. 25, 2014

(65) Prior Publication Data
US 2016/0029838 A1    Feb. 4, 2016

Related U.S. Application Data

(60) Provisional application No. 61/794,686, filed on Mar. 15, 2013.

(51) Int. Cl.
*A47J 37/06* (2006.01)

(52) U.S. Cl.
CPC .................. *A47J 37/0611* (2013.01)

(58) Field of Classification Search
CPC .............. A47J 37/0611; A47J 37/06
(Continued)

(56) References Cited

U.S. PATENT DOCUMENTS

| | | | |
|---|---|---|---|
| 2,362,757 A | * | 11/1944 | Lang .................. F24C 15/14 126/211 |
| 2,899,888 A | | 8/1959 | Koci |

(Continued)

FOREIGN PATENT DOCUMENTS

| DE | 10011354 C1 | 7/2001 |
|---|---|---|
| WO | 0152704 A1 | 7/2001 |

(Continued)

OTHER PUBLICATIONS

International Search Report for application PCT/US2014/022618, dated Jun. 16, 2014, 5 pages.
(Continued)

*Primary Examiner* — Thien S Tran
(74) *Attorney, Agent, or Firm* — Cantor Colburn LLP

(57) ABSTRACT

A cooking system includes a first cooking apparatus including a first base and a first upper heating unit. The first base has a first lower heating plate and the first upper heating unit has a first upper heating plate. The first upper heating unit is moveable to bring the first upper heating plate towards the first lower heating plate. The first base includes a mounting surface configured to receive a plurality of interchangeable lower heating plates including the first lower heating plate and the first upper heating plate is one of a plurality of interchangeable upper heating plates.

14 Claims, 4 Drawing Sheets

(58) Field of Classification Search
USPC .............. 99/330, 331, 340, 349, 373, 378; 426/523
See application file for complete search history.

(56) References Cited

U.S. PATENT DOCUMENTS

| | | | |
|---|---|---|---|
| 5,197,377 A | 3/1993 | Jennings et al. | |
| 5,247,874 A | 9/1993 | George, II et al. | |
| 5,299,492 A | 4/1994 | Carbon et al. | |
| 5,380,986 A | 1/1995 | Mullen | |
| 5,655,434 A | 8/1997 | Liebermann | |
| 6,021,774 A | 2/2000 | Taplan et al. | |
| 6,079,320 A | 6/2000 | Taber et al. | |
| 6,399,925 B1 | 6/2002 | Pickering | |
| 6,518,549 B1 | 2/2003 | Taylor et al. | |
| 7,109,442 B2 | 9/2006 | Steinberg et al. | |
| 8,286,548 B2 | 10/2012 | Krishnan et al. | |
| 2002/0152900 A1 | 10/2002 | Lane | |
| 2003/0092322 A1* | 5/2003 | Khoury .............. | A47J 27/2105 439/638 |
| 2005/0005777 A1* | 1/2005 | Steinberg ............ | A47J 37/0611 99/349 |
| 2006/0272511 A1 | 12/2006 | Dreimann | |
| 2007/0006740 A1 | 1/2007 | Lam | |
| 2008/0105137 A1 | 5/2008 | Genslak | |
| 2010/0132689 A1 | 6/2010 | Contarino, Jr. | |
| 2011/0107923 A1* | 5/2011 | Hess ................... | A47J 37/0635 99/422 |
| 2011/0177222 A1 | 7/2011 | Calzada et al. | |
| 2011/0241608 A1 | 10/2011 | Adamczyk et al. | |
| 2012/0152126 A1* | 6/2012 | Robinson ............. | A47J 37/0611 99/331 |
| 2014/0014087 A1* | 1/2014 | Rosa ................... | A47J 37/0704 126/25 R |

FOREIGN PATENT DOCUMENTS

| | | |
|---|---|---|
| WO | 2010054443 A1 | 5/2010 |
| WO | 2011029146 A1 | 3/2011 |
| WO | 2013024152 A1 | 2/2013 |
| WO | 2014144335 A1 | 9/2014 |

OTHER PUBLICATIONS

Written Opinion for application PCT/US2014/022618, dated Jun. 16, 2014, 5 pages.

* cited by examiner

COOKING APPARATUS WITH MODULAR COOKING SURFACES

BACKGROUND OF THE INVENTION

Embodiments of the invention relate to a cooking apparatus, and in particular to a cooking apparatus having modular cooking surfaces or cooking unit.

Grills for cooking apply heat from a lower heating plate and from an upper heating plate to opposite sides of a food item to decrease cook times and to cook food evenly. In conventional systems, only one type of cooking may be performed on a cooking surface, which may limit the types of food or cooking styles that may be used.

BRIEF DESCRIPTION OF THE INVENTION

Embodiments of the present invention include a cooking system which includes a first cooking apparatus including a first base and a first upper heating unit. The first base has a first lower heating plate and the first upper heating unit has a first upper heating plate. The first upper heating unit is moveable to bring the first upper heating plate towards the first lower heating plate. The first base includes a mounting surface configured to receive a plurality of interchangeable lower heating plates including the first lower heating plate and the first upper heating plate is one of a plurality of interchangeable upper heating plates.

Embodiments of the invention further include a method of controlling a cooking system. The method includes mounting a first lower heating plate on a first base and a first upper heating plate to a first upper heating unit. The first upper heating unit is moveable towards and way from the first base to bring the upper heating plate into contact with an upper surface of a food product on the first lower heating plate. The method includes replacing the first lower heating plate with a second lower heating plate on a mounting surface of the first base.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Conventional commercial grilling appliances are capable of cooking only one type of food using one set of upper and lower heating plates. Embodiments of the invention relate to configurable cooking apparatuses having interchangeable heating plates.

Figure 1:
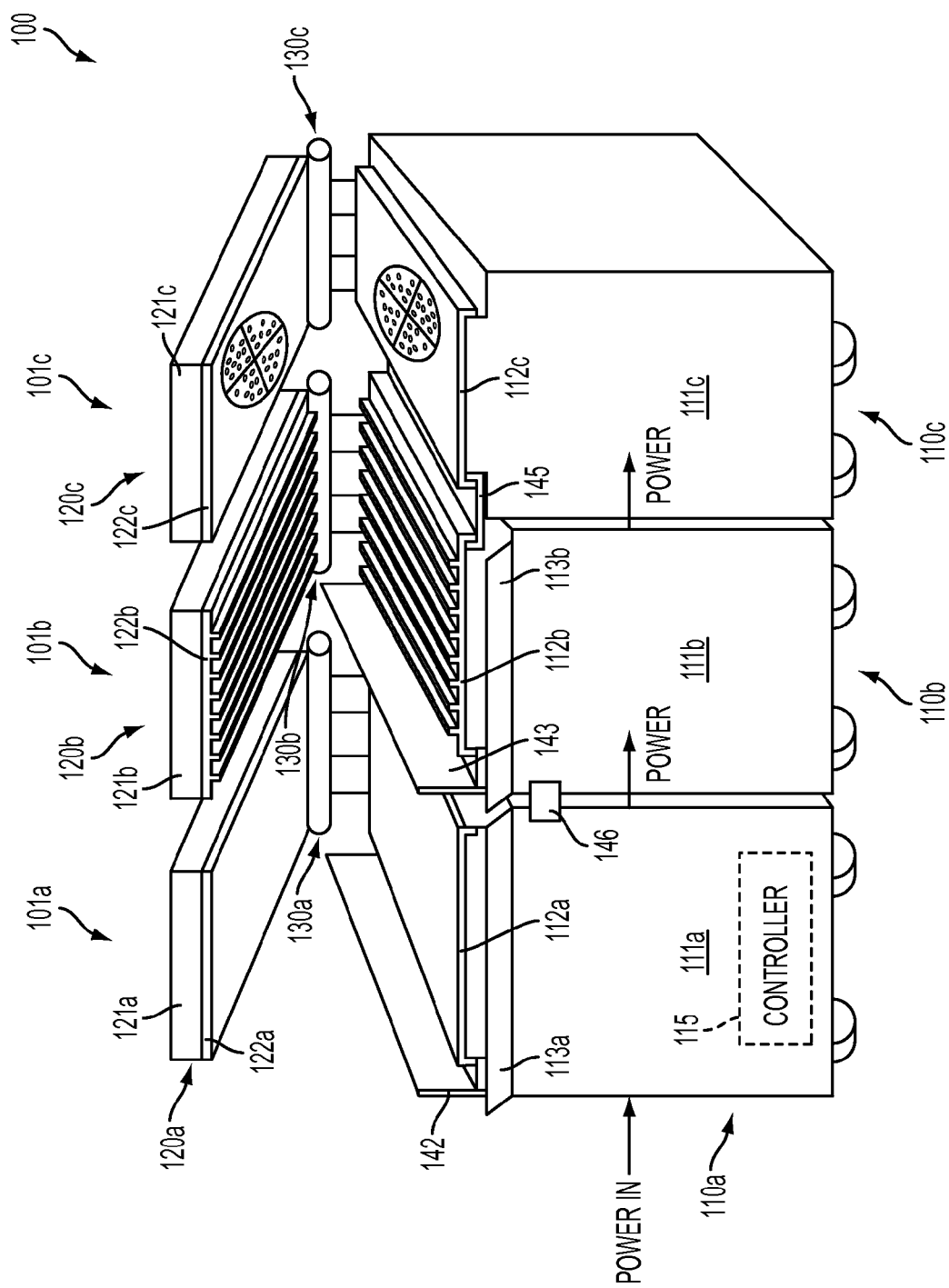
FIG. 1 illustrates a cooking system according to one embodiment of the invention.

FIG. 1 illustrates a cooking system 100 according to one embodiment of the invention. The cooking system 100 includes a first cooking apparatus 101a, a second cooking apparatus 101b and a third cooking apparatus 101c. The first cooking apparatus 101a includes a first base 110a and a first upper heating unit 120a that is moveable with respect to the base 110a. For example, the first upper heating unit 120a may be moveable linearly in a vertical direction towards and away from the first base 110a, and may be rotatable towards and away from the first base 110a. The base 110a includes a housing 111a, a first lower heating plate 112a on which a food product is placed for cooking, a trough 113a for receiving a food by-product, oil or other materials from the first lower heating plate 112a and a controller 115 for controlling electrical functions of the first cooking apparatus 101a.

The upper heating unit 120a includes a first upper housing 121a and a first upper heating plate 122a. During operation, the first upper heating unit 120a is brought into the vicinity of the first lower heating plate 112a, such that the first lower heating plate 112a heats a bottom surface of a food product and the first upper heating plate 122a heats the upper surface of the food product. The second cooking apparatus 101b and the third cooking apparatus 101c each also include a base 110b and 110c and upper heating units 120b and 120c. The bases 110b and 110c include housings 111b and 111c and lower heating plates 112b and 112c. The upper heating units 120b and 120c include housings 121b and 121c and upper heating plates 122b and 122c. The upper heating units 120a, 120b and 120c may move around a hinge 130a, 130b and 130c or any other moving mechanism, such as linear actuators, wires, and cables to move the upper heating units 120a, 120b and 120c with respect to the bases 110a, 110b and 110c.

In embodiments of the invention, the cooking apparatuses 101a to 101c are configured to receive interchangeable heating plates and are interchangeable and moveable with respect to each other. For example, the heating plates 112a and 122a having flat surfaces may be mounted on any one of the cooking apparatuses 101a to 101c, the grilling heating plates 112b and 122b may be mounted on any one of the cooking apparatuses 101a to 101c and the waffle-making heating plates 112c and 122c may be mounted on any one of the cooking apparatuses 101a to 101c. In addition, the cooking apparatuses 101a to 101c may be re-arranged with respect to each other, or removed, or additional cooking apparatuses may be connected to the cooking system 100. While a few examples of types of heating plates are illustrated in FIG. 1, embodiments of the invention encompass any type of heating plates including flat surfaces, grooved surfaces, egg-cookers, bun steamers, Belgian waffle makers, donut makers, muffin makers, waffle makers, steaming trays or any other heating plates.

FIG. 1 illustrates a latch 146 that connects one base 110a to another base 110b. However, the cooking apparatuses 101a to 101c may be connected by any manner, including latches, pins, magnets, wires or any other method. In one embodiment, one or more of the cooking apparatuses 101a to 101c is electrically connected to another one or more of the cooking apparatuses 101a to 101c. In FIG. 1, power is supplied to the base 110a from an external source, such as a power outlet. The cooking apparatuses 101b and 101c may not be electrically connected to an external source, but rather the base 110b receives power from the base 110a, and the base 110c receives power from the base 110b.

In one embodiment, one or more of the cooking apparatuses 101a to 101c includes a controller 115 to control cooking operations. Each of the cooking apparatuses 101a to 101c may include a separate controller, or a single controller may control cooking operations for each cooking apparatus 101a to 101c electrically connected together, as illustrated in FIG. 1. In one embodiment, the controller 115 detects a type of heating plate mounted on the base 101a and adjusts cooking settings based on the detected type of heating plate. For example, the controller may set a cooking temperature, cook time or cooking gap between an upper heating plate and a lower heating plate of a set of Belgian waffle heating plates to be different than a set of flat heating plates or grooved heating plates.

In one embodiment, the controller 115 is a microcontroller including a processor, memory and supporting logic to receive, process and transmit data. The controller 115 may receive data from sensors, such as temperature, weight, pressure or any other sensor data to control a cooking operation. The controller 115 may detect a type of heating plate mounted on the base 101a by sensing a weight of the heating plate, a shape of the heating plate, codes or markings on an underside of the heating plate, or any other features that distinguish one heating plate from another.

In one embodiment, a shield 143 is provided between adjacent heating plates 112a and 112b to provide physical and thermal isolation. For example, if the heating plates 112a and 122a are at a different temperature than 112b and 122b, the shield prevents heat from transferring between the heating plates of the different cooking apparatuses 101a and 101b. In another embodiment, a shield 142 is provided at an end-most cooking apparatus 101a to provide physical isolation of the heating plates 112a and 122a. For example, the shield 142 may prevent inadvertent contact with the heating plates 112a and 122a, and the shield may prevent food products or splatter from traveling past the shield 142 into a cooking area.

In one embodiment of the invention, a trough 145 is located between adjacent lower heating plates 112b and 112c. The trough 145 may serve to catch food by-products and to hold the lower heating plates 112b and 112c in position. In one embodiment, the trough 145 is a thermally insulating material.

Figure 2A:
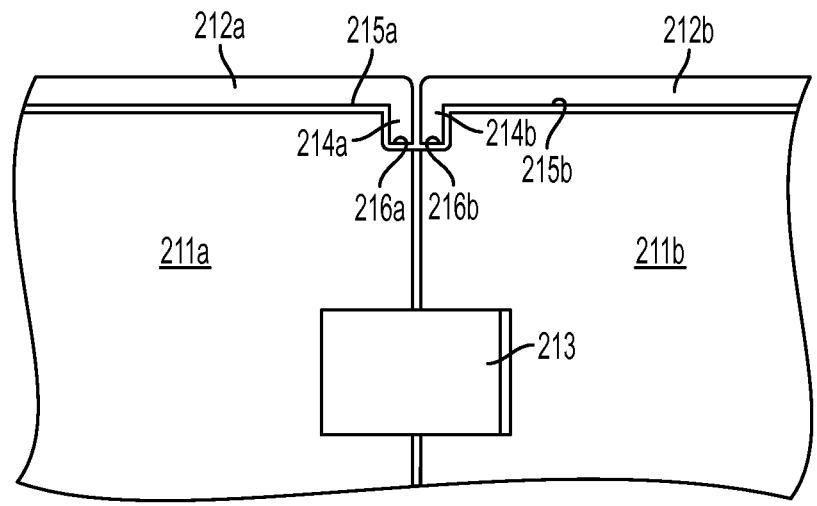
FIG. 2A illustrates a region where two heating apparatuses connect according to one embodiment.

FIG. 2A illustrates a region where two heating apparatuses connect according to one embodiment. In FIG. 2A, a first housing 211a has a mounting surface 215a that receives a lower heating plate 212a. The lower heating plate 212a includes a protrusion 214a which protrudes downward into a recess 216a formed by the elevated mounting surface 215a. Similarly, a second housing 211b has an elevated mounting surface 215b that receives a lower heating plate 212b. The lower heating plate 212b includes a protrusion 214b which protrudes downward into a recess 216b formed by the elevated mounting surface 215b. A latch 213 connects the first housing 211a to the second housing 211b. The first housing 211a and the second housing 211b correspond to the housings of cooking apparatuses, such as the housings 111a and 111b of cooking apparatuses 101a and 101b of FIG. 1.

Figure 2B:
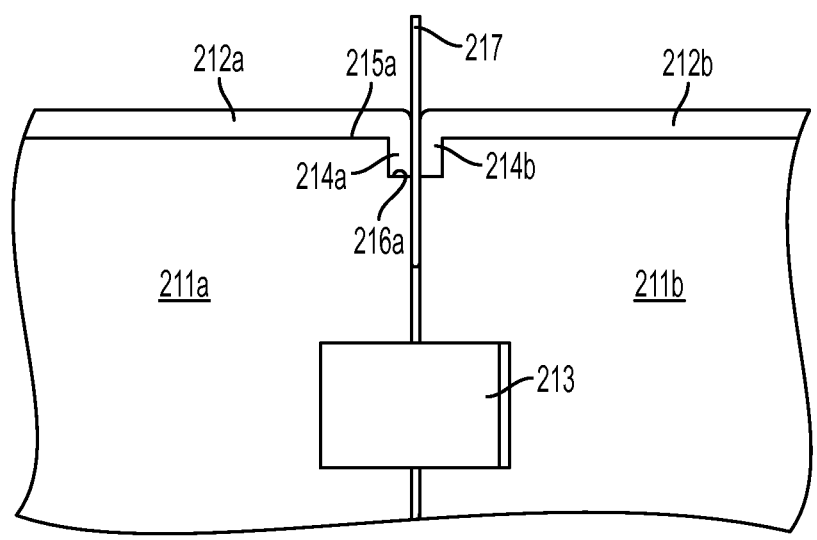
FIG. 2B illustrates a region where two heating apparatuses connect according to another embodiment.

In the embodiment illustrated in FIG. 2A, the edges of the lower heating plates 212a and 212b are adjacent to each other, separated only by a small gap. In other embodiments, the edges of the heating plates 212a and 212b may contact each other. In yet other embodiments, such as the embodiment illustrated in FIG. 2B, the lower heating plates 212a and 212b may be separated by a structure, such as a shield 217. The shield 217 may be connected to one of the housings 211a and 211b by any fixing mechanism, such as latches, receptacles, screws, bolts, adhesives, welds or any other fixing mechanism. The shield 217 provides thermal isolation between the first and second lower heating plates 212a and 212b, as well as physical isolation to prevent food from crossing from one of the heating plates to the other.

In one embodiment of the invention, the lower heating plates 212a and 212b rest on the raised surfaces 215a and 215b. The lower heating plates 212a and 212b may be removed and replaced according to the desired cooking operation by lifting the lower heating plates 212a and 212b, or, in one embodiment, sliding the lower heating plates 212a and 212b.

Figure 3:
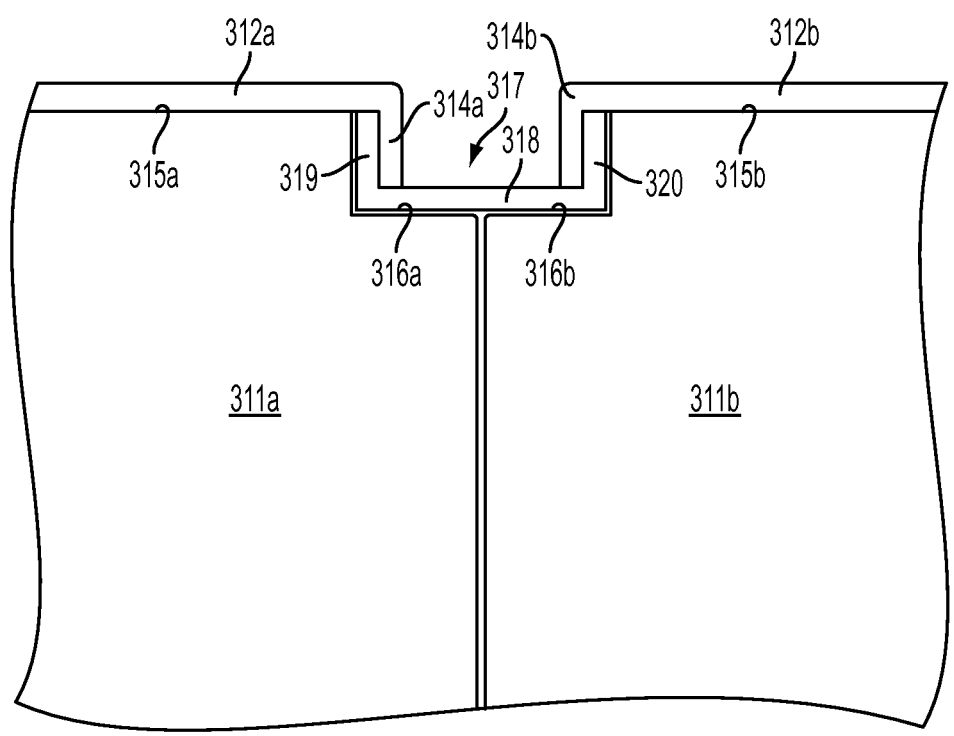
FIG. 3 illustrates a region where two heating apparatuses connect according to another embodiment.

FIG. 3 illustrates a region where two heating apparatuses connect according to another embodiment. In FIG. 3, a first housing 311a has an elevated or raised mounting surface 315a that receives a lower heating plate 312a. The lower heating plate 312a includes a protrusion 314a which protrudes downward into a trough 317. The trough 317 rests on upward-facing surfaces 316a and 316b defining a recess with respect to the elevated mounting surfaces 315a and 315b. Similarly, the elevated mounting surface 315b of the second housing 311b receives a lower heating plate 312b. The lower heating plate 312b includes a protrusion 314b which protrudes downward into the trough 317. The first housing 311a and the second housing 311b correspond to housings of cooking apparatuses, such as the housings 111a and 111b of cooking apparatuses 101a and 101b of FIG. 1.

The trough 317 includes a bottom side 318 and side walls 319 and 320. In the embodiment illustrated in FIG. 3, the downward-extending protrusions 314a and 314b of the first and second lower heating plates 312a and 312b are located inwardly of the side walls 319 and 320 relative to a center of the trough 317. However, embodiments of the invention encompass any configuration of the protrusions 314a and 314b with respect to the trough 317. In one embodiment, the downward-extending protrusions 314a and 314b may rest on side walls 319 and 320, or the side walls 319 and 320 of the trough 317 may extend up to an underside of the lower heating plates 312a and 312b.

While a few examples of surfaces and mechanisms for mounting lower heating plates onto cooking apparatuses have been illustrated, embodiments of the invention encompass any methods and devices that permit users to interchange different lower heating plates and upper heating plates onto cooking apparatuses. The methods and devices may include protrusions and grooves, as illustrated in FIGS. 2A to 3, latches, holes and pins, or any other readily removable connection mechanisms. For example, the heating plates may not be affixed to the cooking apparatuses by screws or bolts or other semi-permanent fixing mechanisms.

Figure 4:
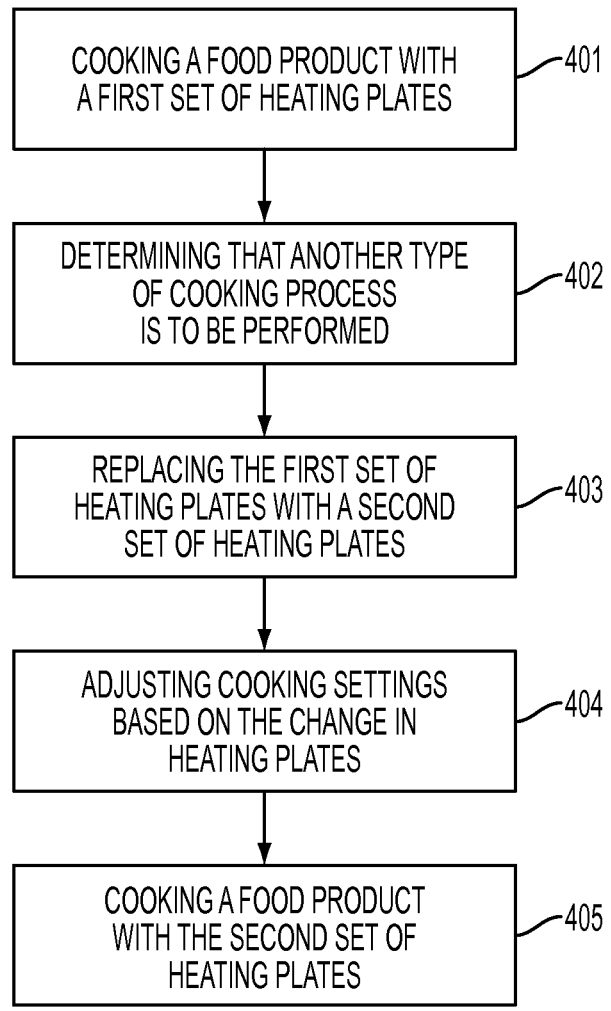
FIG. 4 illustrates a flowchart of a method according to an embodiment of the invention.

FIG. 4 illustrates a flowchart of a method according to an embodiment of the invention. In block 401 a food product is cooked on a cooking apparatus having a first set of upper and lower heating plates to heat an upper surface and lower surface of the food product. In block 402, it is determined that another type of cooking process is to be performed. In particular, it is determined that another cooking process requiring a different set of cooking plates is to be performed. In block 403, the first set of heating plates is replaced with the second set of heating plates. The first and second sets of heating plates may have different surface features and shapes to correspond to different cooking processes and different types of foods. Examples of different types of heating plates include heating plates having flat surfaces, grooved surfaces, egg-cookers, bun steamers, Belgian waffle makers, donut makers, muffin makers, waffle makers, steaming trays or any other heating plates.

In block 404, the cooking settings are adjusted based on the change in the heating plates. For example, in one embodiment a controller detects the change in heating plates by detecting characteristics of the heating plates, such as marks or codes on the plates, a weight or shape of the plate, or any other features that distinguish one set of heating plates from another. The controller may then automatically adjust a cooking temperature, cooking time, or cooking gap between the plates based on the detected type of heating plates.

In block 405, a food product is cooked on the second set of heating plates.

According to embodiments of the invention, modular upper and lower heating plates may be provided to upper heating units and bases to provide multiple different cooking surfaces on the same device. In some embodiments, a shield is provided between heating plates to provide heat isolation and physical isolation between heating plates, allowing for the cooking of different food products. In addition, the shield may prevent food products and by-products, such as oil splatter, from moving between heating plates. In some embodiments, lower or upper heating plates of different modules or zones may be separately controlled to provide cooking gaps of different heights. For example, a first cooking apparatus may have an upper and/or lower heating plate adjusted to form a first height to cook a first food product, and a second cooking apparatus connected to the first cooking apparatus may have an upper and/or lower heating plate adjusted to form a second height to cook a second food product having a height different than the first food product.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cooking system, comprising:
   a first cooking apparatus including a first base and a first upper heating unit, the first base having a first lower heating plate and the first upper heating unit having a first upper heating plate, the first upper heating unit being moveable to bring the first upper heating plate towards the first lower heating plate,
   wherein the first base includes a mounting surface configured to receive a plurality of interchangeable lower heating plates including the first lower heating plate,
   the first upper heating plate is one of a plurality of interchangeable upper heating plates;
   a second cooking apparatus attached to the first cooking apparatus, the second cooking apparatus including a second base and a second upper heating unit, the second base having a second lower heating plate and the second upper heating unit having a second upper heating plate; and
   a trough between the first lower heating plate and the second lower heating plate, the trough defined by a first end wall and a second end wall, wherein the first lower heating plate includes a first protrusion on a lower surface of the first lower heating plate that contacts the trough.

2. The cooking system of claim 1, wherein the plurality of upper heating plates are interchangeable by detaching from the first upper heating unit the first upper heating plate and attaching one of the plurality of upper heating plates to the upper heating unit.

3. The cooking system of claim 1, wherein the plurality of upper heating plates are interchangeable by detaching the first upper heating unit from a connection to the first base and attaching another upper heating unit having one of the plurality of upper heating plates to the first base.

4. A cooking system, comprising:
   a first cooking apparatus including a first base and a first upper heating unit, the first base having a first lower heating plate and the first upper heating unit having a first upper heating plate, the first upper heating unit being moveable to bring the first upper heating plate towards the first lower heating plate,
   wherein the first base includes a mounting surface configured to receive a plurality of interchangeable lower heating plates including the first lower heating plate,
   the first upper heating plate is one of a plurality of interchangeable upper heating plates;
   further comprising a controller to detect a type of the first lower heating plate and to automatically adjust, without user input, cook settings based on the detected type.

5. The cooking system of claim 4, wherein the controller stores a plurality of cook settings corresponding to the plurality of lower heating plates, and the controller is configured to adjust the cook setting based on detecting one of the plurality of lower heating plates mounted on the mounting surface.

6. The cooking system of claim 1,
   wherein the second cooking apparatus is electrically connected to the first cooking apparatus to receive power from the first cooking apparatus.

7. The cooking system of claim 1, further comprising:
   a shield connected to at least one of the first cooking apparatus and the second cooking apparatus, the shield having a height greater than a height of the first lower heating plate and the second lower heating plate.

8. The cooking system of claim 1, wherein the second lower heating plate includes a second protrusion that contacts the trough, the first protrusion contacting the first end wall and the second protrusion contacting the second end wall.

9. A cooking system, comprising:
   a first cooking apparatus including a first base and a first upper heating unit, the first base having a first lower heating plate and the first upper heating unit having a first upper heating plate, the first upper heating unit being moveable to bring the first upper heating plate towards the first lower heating plate,
   wherein the first base includes a mounting surface configured to receive a plurality of interchangeable lower heating plates including the first lower heating plate,
   the first upper heating plate is one of a plurality of interchangeable upper heating plates;
   a second cooking apparatus attached to the first cooking apparatus, the second cooking apparatus including a second base and a second upper heating unit, the second base having a second lower heating plate and the second upper heating unit having a second upper heating plate; and
   a trough between the first lower heating plate and the second lower heating plate, the trough defined by a first end wall and a second end wall, wherein the first lower heating plate includes a first protrusion on a lower surface of the first lower heating plate that contacts the trough;

wherein the trough includes a center wall between the first and second lower heating plates, the center wall having a height greater than the first and second lower heating plates.

10. The cooking system of claim 1, wherein the mounting surface of the first base and a mounting surface of the second base are raised surfaces, and the trough is configured to fit on an upward-facing surface of the first and second bases in a depression formed by the mounting surfaces of the first and second bases.

11. A method of controlling a cooking system, comprising:

mounting a first lower heating plate on a first base and a first upper heating plate to a first upper heating unit, the first upper heating unit being moveable toward and way from the first base to bring the first upper heating plate into contact with an upper surface of a food product on the first lower heating plate;

replacing the first lower heating plate with a second lower heating plate on a mounting surface of the first base;

wherein the first lower heating plate and the second lower heating plate include downward-extending protrusions at ends of the first and second lower heating plates, the mounting surface is a raised surface, and replacing the first lower heating plate with the second lower heating plate includes lifting the first lower heating plate off of the raised surface and lowering the second lower heating plate onto the raised surface, such that the downward-extending protrusions of the second lower heating plate extend below the raised surface.

12. A method of controlling a cooking system, comprising:

mounting a first lower heating plate on a first base and a first upper heating plate to a first upper heating unit, the first upper heating unit being moveable toward and way from the first base to bring the first upper heating plate into contact with an upper surface of a food product on the first lower heating plate;

replacing the first lower heating plate with a second lower heating plate on a mounting surface of the first base;

detecting, by a controller, a type of the second lower heating plate; and automatically adjusting cooking settings according to the detected type.

13. The method of claim 11, further comprising:

connecting a second base to the first base, the second base including a third lower heating plate, the second base being connected to a second upper heating unit having a second upper heating plate.

14. The method of claim 13, further comprising: providing power from the first base to the second base.

* * * * *